United States Patent [19]

Moore, Jr.

[11] 3,894,572

[45] July 15, 1975

[54] PROCESS FOR FORMING A REFRACTORY LAMINATE BASED ON POSITIVE SOLS AND REFRACTORY MATERIALS CONTAINING CHEMICAL SETTING AGENTS

[75] Inventor: Earl Phillip Moore, Jr., Wilmington, Del.

[73] Assignee: E. I. du Pont de Nemours & Company, Wilmington, Del.

[22] Filed: July 20, 1973

[21] Appl. No.: 381,237

Related U.S. Application Data

[60] Division of Ser. No. 148,961, June 1, 1971, abandoned, which is a continuation-in-part of Ser. No. 49,909, June 25, 1970, abandoned.

[52] U.S. Cl. ............... 164/26; 106/38.3; 106/38.35; 106/286; 427/135; 427/403
[51] Int. Cl. .................................................. B29c 1/04
[58] Field of Search ......... 117/62, 62.2, 70 R, 70 D, 117/26, 5.1, 113; 106/38.3, 38.35, 164/36, 34, 41; 156/89

[56] References Cited
UNITED STATES PATENTS

| | | | |
|---|---|---|---|
| 3,007,878 | 11/1961 | Alexander et al. | 106/286 |
| 3,232,771 | 2/1966 | Pearce | 106/38.35 |
| 3,270,382 | 9/1966 | Emblem et al. | 106/38.35 |
| 3,396,775 | 8/1968 | Scott | 164/26 |
| 3,399,067 | 8/1968 | Scott | 106/38.35 |
| 3,428,465 | 2/1969 | McLeod | 106/38.35 |
| 3,507,944 | 4/1970 | Moore, Jr. | 264/109 |

*Primary Examiner*—Ralph Husack
*Assistant Examiner*—Dennis C. Konopacki

[57] ABSTRACT

A rapid process for forming a refractory laminate on the surface of a support structure which comprises dipping the structure into a bath comprising a sol of positively charged colloidal particles to form a coating on the surface, and applying to the surface a particulate refractory material containing a chemical setting agent. This procedure is repeated until a laminate of the desired thickness is built up on the surface. The chemical setting agent can be coated on or mixed with the refractory particles, and can be (1) an organic or inorganic base, (2) a monofunctional organic acid or salt having an anionic portion containing 6–24 carbon atoms, (3) a polyfunctional organic or inorganic acid or salt, or (4) colloidal silica particles. This technique makes it possible to successively apply and set coatings in very short times without intermediate drying and without sloughing of coats. The process is particularly suited for making expandable refractory shell molds for precision investment casting of metals by the so-called "lost-wax" technique.

10 Claims, No Drawings

PROCESS FOR FORMING A REFRACTORY LAMINATE BASED ON POSITIVE SOLS AND REFRACTORY MATERIALS CONTAINING CHEMICAL SETTING AGENTS

REFERENCE TO RELATED APPLICATIONS

This is a division of application Ser. No. 148,961, filed June 1, 1971 now abandoned, which itself is a continuation-in-part of my then copending application Ser. No. 49,909, filed June 25, 1970, now abandoned.

BACKGROUND OF THE INVENTION

This invention relates to a process for forming refractory laminates. The process is useful for a variety of purposes but it was developed for and is particularly suited to the manufacture of expendable refractory shell molds for precision investment casting of metals by the lost-wax or disposable pattern technique.

Refractory shell molds for precision investment casting are usually prepared by dipping a disposable pattern, which is a replica of the part to be cast, into a refractory slurry consisting of a suspension of fine refractory grain in a bonding liquid. The disposable pattern is usually wax or plastic and is solvent cleaned prior to dipping into the slurry. Other disposable materials such as low-melting tin-bismuth alloy and frozen mercury are sometimes employed for the pattern. The binder is generally capable of hardening during drying at room temperature. After dipping, the excess slurry is drained from the coated pattern and while the coating is still wet it is stuccoed with coarser refractory particles. The stuccoing is carried out by dipping the coated pattern into a fluidized bed of the refractory particles or by sprinkling the particles onto the pattern. The process of dipping and stuccoing is repeated until a refractory shell having sufficient thickness to resist stresses incurred in subsequent casting operations is built up around the pattern. The usual thickness of the shell is from one-eighth to one-half inch, although thinner or thicker shells may be produced. The completed pattern is usually dried under ambient conditions for 24 hours. The disposable pattern is then usually removed from the refractory shell mold by flash dewaxing furnaces, steam autoclaves, or boiling solvent baths. The ceramic shell mold is then fired at 1,700°–1,900°F. to prepare it for metal casting.

In this conventional manner of making refractory shell molds the period of drying between coating applications may vary from 30 minutes to 4 hours depending on temperature, humidity, air flow and complexity of the pattern. This greatly increases the time and cost involved in making the molds. Drying is particularly slow in recessed areas or "blind cores" (hollow openings, closed at one end). These refractory molds may dry only after many hours, since much of their surface area is not suitably disposed to drying by the atmosphere. Drying is necessary to harden the slurry coatings and to insure that subsequent coats will adhere to previous ones without sloughing away.

Another shortcoming of the conventional method of making shell molds is that when the slurry is dried microfractures often occur on hardening. When the next slurry coating is applied the binder in the slurry may flow through the stucco and either dissolve the slurry coating in part or cause it to flake.

Because of these shortcomings of the conventional mold forming processes, efforts have been made to develop chemical methods for rapid setting of the binder coatings, in order to eliminate the requirement of drying between dips and reduce the time interval between dips to a few minutes. One approach has been to use a gaseous reactant in order to set the binder. U.S. Pat. No. 2,829,060 discloses the use of carbon dioxide to set sodium silicate-bonded shells containing ammonia. U.S. Pat. No. 3,455,368 discloses the use of ammonia gas to set hydrolyzed ethyl silicate or acidified aqueous colloidal silica-bonded shells. U.S. Pat. No. 3,396,775 discloses the use of volatile organic bases in order to set shells bonded with hydrolyzed ethyl silicates.

Volatile solvents and gaseous ammonia present ventilation problems to the foundry. These problems have contributed to the slow acceptance of the present fast-setting systems.

Another approach has been to use an acidified aqueous colloidal silica to gel a basic colloidal silica and vice versa. In this approach both binders are negatively charged and gelation occurs because of pH changes. This system is described in a paper by Shipstone, Rothwell and Perry, "Drying Ceramic-Shell Moulds", British Investment Casters' Technical Association, 9th Annual Conference. However, systems based on gelling due to pH changes have not found wide spread acceptance because gelation is slow and the resulting wet gels are weak. This gives rise to sloughing off of the early coats during subsequent dipping.

A third rapid setting approach in the art employs sodium silicate as the binder and mono-ammonium phosphate and magnesium oxide are in the stucco as a gelling agent. This is described in an article by Dootz, Craig, and Peyton, "Simplification of the Chrome-Cobalt Partial Denture Casting Procedure," J. Prosthetic Dentistry, Vol. 17, No. 5, pages 464–471, May 1967.

A fourth approach employs an ethyl silicate dip coat which is set with aqueous colloidal silica containing ammonia. This is disclosed in an article by Shepherd, "Adaptation of the Ceramic Shell Mould to Meet Mass Production Requirements", British Investment Casters' Technical Association.

A fifth approach has been to add a volatile, organic solvent to the silica sol. Relatively rapid gelling is obtained by allowing the solvent (usually an alcohol) to evaporate. For a simple casting the time required for evaporation may be only several minutes, but for a complex casting evaporation may require several hours, since diffusion of solvent from deeply recessed areas or blind core areas is slow.

SUMMARY OF THE INVENTION

This invention is a rapid process for forming a refractory laminate on the surface of a support structure which comprises:

a. dipping the structure in a bath comprising a sol of positively charged colloidal particles of an inorganic substance to form a coating on the surface, b. applying to the surface a particulate refractory material containing a chemical setting agent, said setting agent being selected from the group consisting of (1) organic and inorganic bases, (2) monofunctional organic acids and their salts having an anionic portion containing at least one alkyl group of from 6 to about 24 non-carboxyl carbon atoms per acid functional group, (3) polyfunctional organic and inorganic acids and their salts, and (4) negatively charged colloidal particles of an inorganic substance, and c. repeating steps (a) and (b) as required to build a refractory laminate of the desired thickness.

In a preferred embodiment the bath of step (a) comprises a slurry of particulate refractory grain (inorganic compound or metal) in a sol of positively charged colloidal particles composed of a silica core coated with a polyvalent metal-oxygen compound. In a particularly preferred embodiment the positively charged particles are composed of colloidal silica coated with alumina.

As mentioned previously, the process of this invention is particularly suited to the manufacture of expendable refractory shell molds for precision investment casting of metals. In this use of the invention a disposable pattern of the metal casting is dipped into a bath comprising a sol of positively charged colloidal particles to form a coating on the pattern. Thereafter the coated pattern is stuccoed with a refractory grain containing a chemical setting agent selected from the group set out above. This procedure is then repeated as required to build a refractory shell mold of the desired thickness. Preferably the dip bath used in step (a) comprises a slurry of refractory grain in a sol of positively charged colloidal particles composed of a silica core coated with a polyvalent metaloxygen compound. In the most preferred embodiment these positively charged colloidal particles are alumina coated silica particles. In a preferred embodiment two slurries of refractory grain in positive sol are used. The first slurry contains relatively fine refractory grain and is used for the first or prime coat. The second contains relatively coarse refractory grain and is used for subsequent coats (back-up or follow-up coats).

The invention also includes compositions comprising particulate refractory material, such as stucco refractory grain, in combination with a chemical setting agent selected from the group set out above. The amount of setting agent in the composition ranges from about 1 to about 30 percent by weight, based on the weight of the refractory material; preferably, the amount is in the range of 3 to 15 percent. It is also preferred that the chemical setting agent be present in the composition as a coating on the refractory material.

For the manufacture of refractory shell molds the process of this invention offers a number of advantages as compared to the above-described prior art processes. Most importantly it is a rapid process because it is not necessary to dry between coats. After the pattern has been coated by dipping in the positive sol bath, and while the coating is still wet, it can be stuccoed. The chemical setting agent in the stucco causes coagulation of the positive sol, with consequent immobilization of the coating. Generally, it is necessary to allow 1 to 5 minutes for a chemical setting agent to immobilize a coating after stuccoing before a pattern can be re-dipped. The time required depends upon solubility of the compound in the coating mixture and its level of activity.

DESCRIPTION OF THE INVENTION

The invention will now be described in detail with particular reference to its use in forming expendable refractory shell molds for precision investment casting of metals.

Positive Sols

This invention utilizes sols of positively charged colloidal particles. Such sols are referred to herein as positive sols. The preferred positive sols for use in this invention are those in which the positively charged colloidal particles are composed of a silica core coated with a polyvalent metal-oxygen compound. Sols of this type are described in U.S. Pat. No. 3,007,878. As indicated in this patent, the polyvalent metal-oxygen compound which can be used to provide a positive surface charge on colloidal silica particles can be any compound of the class of metal oxides, metal hydroxides and hydrated metal oxides of trivalent aluminum, chromium, gallium, indium, and thallium or tetravalent titanium, germanium, zirconium, tin, cerium, hafnium and thorium. For purposes of economics it is preferred that the positive sol be an aqueous dispersion of alumina-coated colloidal silica particles of the type illustrated in FIG. 1 of U.S. Pat. No. 3,007,878.

An example of a charged alumina-coated silica sol which is particularly useful in this invention is one in which there is 1 mole of aluminum per mole of surface silica and which is prepared by a process described in Example 2 of copending commonly assigned application Ser. No. 831,748 as follows:

264 lbs. of "Ludox" HS colloidal silica containing 40 percent $SiO_2$ by weight, the silica particles having an average particle size of 12–15 millimicrons and a specific surface area of about 215 $m^2/g$. $SiO_2$, is adjusted to pH 7.50 with 821 grams of a 1:1 mixture of a concentrated hydrochloric acid in water. The sol is mixed with 62.8 lbs. of 50 percent chlorohydrol ($Al_2(OH)_5Cl$) and 61.7 lbs. of water by introducing it at a rate of 25 lbs./minute into a centrifugal pump circulating the basic aluminum chloride solution. The clear fluid intermediate product is heated to 60°C. in one-half hour and at 60°C. for 2 hours, cooled to 20°C., and stirred with a Lithtin mixer as well as circulated with the pump as 600 grams magnesium hydroxide dispersed in 1,800 grams water is introduced in 5 minutes to bring the pH to 5.65. Agitation and circulation are continued for 2 hours. The clear stable product contains 26.4% $SiO_2$, 4.2% $Al_2O_3$, 1.0% Cl and 0.23% MgO. The mole ratio of aluminum to surface $SiO_2$ is 1:1. The pH of the product after several weeks aging is 4.60, the viscosity is 15 cps, and the specific gravity at 25°C. is 1.23. This product (referred to hereinafter as Positive Sol 130M), is the positive sol which is used in the examples (except Example XVI), set forth hereinbelow.

The medium for the positive sol need not be water. Low molecular weight alcohols or other polar organic liquids can be present in part or can entirely replace water.

Positive Sol 130M is stabilized by chloride ion. As described in U.S. Pat. No. 3,007,878 other anions, such as formate, acetate, lactate, nitrate, bromide, perchlorate, bromate, and trichloroacetate, can be used instead of chloride.

Other positive sols can be used in this invention in place of the sol composed of colloidal silica particles coated with polyvalent metal-oxygen compounds. In particular, sols from a number of commercially available dispersible, colloidal aluminas, such as "Dispal" (Continental Oil Co.), "Alon G" (Cabot Corp.), and "Super-Ox" (Merkal Research Co.), can be used.

Inorganic and Organic Base Setting Agents

When the pH of an aqueous positive sol of the preferred type is raised to about 6 to 7 or higher by addition of an organic or inorganic base, polymerization of the aluminum (or other polyvalent metal) coating on the colloidal silica particles occurs, thus effecting an aggregation of particles and producing a stiff gel structure. When the medium of the positive sol is not 100 percent water, of course, the polymerization and consequent gelling may occur at a somewhat different pH, but can nevertheless be brought about by addition of an inorganic or organic base. Thus, inorganic and organic bases can be used as setting agents in this invention.

Some bases suitable as setting agents in this invention are

Inorganic bases such as hydroxides of lithium, sodium, potassium, rubidium, cesium, magnesium, calcium, strontium and barium;

Inorganic nitrogen bases such as ammonia, hydrazine and hydroxylamine and organic derivatives of these such as methylhydrazine and N-methylhydroxylamine, Amines such as methylamine, dimethylamine, trimethylamine, ethylamine, butylamine, dodecylamine, hexadecylamine, benzylamine, allylamine, N,N-diethylaniline, and cyclohexylamine.

Aminoalcohols such as ethanolamine, diethanolamine, triethanolamine and 2-methoxyethanolamine;

Imines such as acetamidine, benzamidine, guanidine, N,N-dimethylguanidine, guanidine carbonate, and cyclohexanonimine.

Heterocyclic nitrogen compounds such as pyridine, pyrrolidine, 4-aminopyridine, and imidazole.

Polyamines such as 1,2-ethanediamine, 1,8-octanediamine, 1,3-diamino-2-propanol and 1,2,4-triaminobutane;

Quaternary ammonium bases such as tetramethylammonium hydroxide and tetrabutylammonium hydroxide;

Polymeric basic materials such as the polyethylenimines, the polymerized diallylamines, and the urea-formaldehydepolyamine reaction products.

Most preferred basic reagents for this invention are ammonia, methylamine, dimethylamine, and trimethylamine; lithium hydroxide, sodium hydroxide, potassium hydroxide, magnesium hydroxide, calcium hydroxide.

Monofunctional Organic Acid and Salt Setting Agents

The monofunctional organic acids which can be used as setting agents for positive sols in the process of this invention are compounds which contain 6 to about 24 non-carboxyl carbon atoms. Salts of these acids can also be used. Although the invention is not to be limited by any theory, it is believed that the setting action is due to the combined interaction between the negatively charged anionic portions of the acids and salts and the positively charged colloidal particles of the positive sols, and the attraction between the hydrocarbon portions of the anions. The affinity of hydrocarbon groups increases with increasing carbon content, so it is preferred that the number of carbon atoms be in the range of 8 to 18.

Representative of the organic acid compounds which are suitable for use in this invention are compounds of the following formulae:

(1) 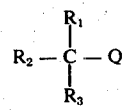

wherein
$R_1$, $R_2$ and $R_3$ are the same or different and are
 a. hydrogen,
 b. straight chain aliphatic, branched aliphatic or alicyclic, or
 c. any of (b) containing one unsaturation, provided that $R_1$ can be joined with $R_2$ or $R_3$ to form an alicyclic group which can also contain one unsaturation;

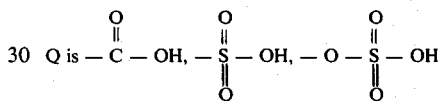

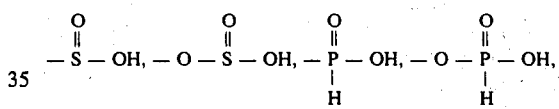

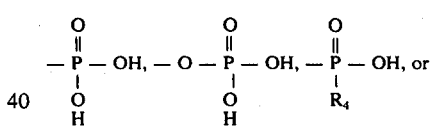

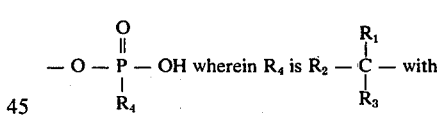

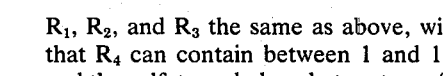

$R_1$, $R_2$, and $R_3$ the same as above, with the limitation that $R_4$ can contain between 1 and 10 carbon atoms; and the sulfate and phosphate esters of (a) esters of the above acids and polyfunctional alcohols or thioalcohols or (b) amides of the above acids and aminoalcohols; with the limitation that the compound must contain between 6 and 24 carbon atoms per acid group. The preferred number of carbon atoms per acid group is 8 to 18.

(2) 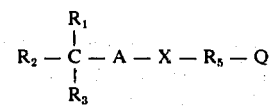

wherein 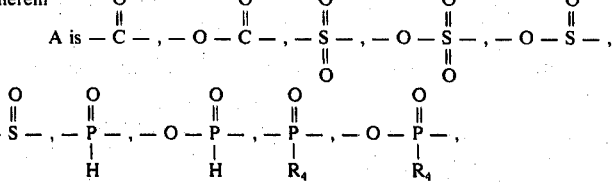

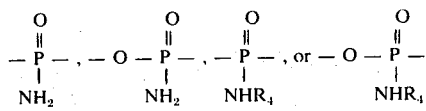

X is $-NH-$, $-NR_4-$, $-O-$, or $-S-$, $R_5$ is straight or branched aliphatic or alicyclic of 2 to 10 carbon atoms which can contain up to one hydroxyl group per carbon atom, and $R_1$, $R_2$, $R_3$, $R_4$ and Q are as defined above for formula (1); with the limitation that the comound must contain between 6 and 24 (preferably 8 and 18) carbon atoms.

In some compounds the actual number of carbon atoms can exceed 24. For example, compounds of formula (3) below can contain more than 24 carbons, yet be effective setting agents:

(3) 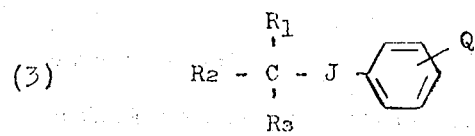

wherein

J is $-CH_2-$, $-O-$, $-S-$, $-NH-$, $-\underset{R_4}{N}-$,

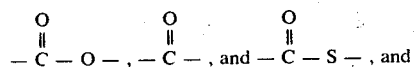

$R_1$, $R_2$, $R_3$ and Q are as defined above for formula (1).

It appears that in structures of formula (3) the aromatic ring structure behaves not as 6 carbons but more as 2 carbons, as far as the effect of total number of carbon atoms is concerned.

The salts of the above-described acids, as well as mixtures of acids, mixtures of salts, and mixtures of salts and acids, are also effective setting agents. Typical salts are the sodium, potassium, lithium, and organic amine salts.

Particular acid compounds which are good setting agents in accordance with this invention include salts of substituted hydrolyzed protein acids such as "Maypon UD" sodium undecylenyl polypeptidate, and "Maypon 4C" potassium cocoyl polypeptidate; straight chain saturated carboxylic acids such as hexanoic, heptanoic, octanoic, nonanoic, decanoic, undecanoic, dodecanoic, tridecanoic, tetradecanoic, pentadecanoic, hexadecanoic, heptadecanoic, octadecanoic, tetracosanoic, and their mixtures; unsaturated acids such as oleic and 10-undecylenic; mixed branched chain acids such as neo-pentanoic, neo-heptanoic, neo-decanoic, and neo-tridecanoic; substituted acids such as perfluorooctanoic and omega-H-perfluorooctanoic acid; salts of the above acids such as the ammonium, sodium, potassium, lithium and organic amine salts; aromatic compounds such as long-chain alkyl benzene sulfonic acids and their salts, e.g., dodecyl benzene sulfonic acid; carboxylic acids and their salts, e.g., p-octyl benzoic acid; and other compounds including salts of esters of long chain monohydric alcohols and phosphoric or sulfuric acid such as "Duponol" C sodium lauryl sulfate, "Duponol" AM ammonium lauryl sulfate, and "Duponol" EL triethanol amine lauryl sulfate; and such compounds as cyclohexyl butyric acid; 10-hydroxydecanoic acid; "Maprosyl" 30 sodium lauryl sarcosinate; sodium pentachlorophenate; "Zonyl" S-13 fluoroalkyl phosphates; dioctyl sodium sulfosuccinate; chlorendic acid; and "Zelec" UN fatty alcohol phosphate.

Preferred anionic organic compounds for this invention are octanoic, decanoic, nonanoic, undecanoic, dodecanoic, tridecanoic, tetradecanoic, pentadecanoic, 10-undecylenic, neodecanoic, neotridecanoic, p-octylbenzoic and cyclohexyl butyric acids and their salts, long-chain benzene sulfonic acids and their salts, sodium lauroyl sarcosinate, dioctyl sodium sulfosuccinate, fluoroalkyl phosphates, "Maypon UD" sodium undecylenyl polypeptidate, "Maypon 4C" potassium cocoyl polypeptidate, and esters of long-chain monohydric alcohols and sulfuric or phosphoric acids and their salts. The "long-chain" designation as it is used above is intended to mean 6 or more carbon atoms, and where substituted comounds are mentioned the substituents are not limiting or critical either as to kind or number.

Polyfunctional Organic Acid and Salt Setting Agents

Polyfunctional organic acids and their salts can also be used as setting agents for the positive sol coatings. It is believed that the setting effect of these polyanionic materials is due to the strong interaction between the anionic portions of the molecules and the positively charged particles, and a resultant crosslinking and aggregation of colloidal particles due to the presence of two or more anionic portions in a single molecule.

The polyfunctional acid and salt setting agents can be organic or inorganic. The organic agents can be monomeric or polymeric and should contain a maximum of about 24 carbon atoms per acid functional group.

Representative of the organic acid functional groups which are useful in these setting agents are:

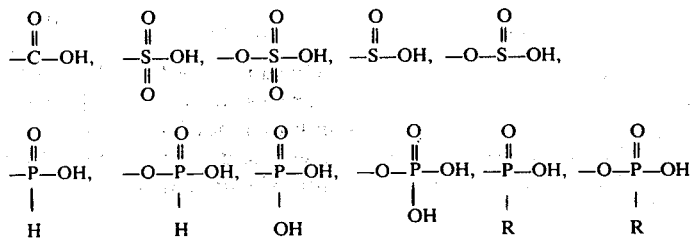

where $R = CH_3-$, $CH_3CH_2-$

More than one type of acid group can be present in a single compound. For example, a compound useful as a setting agent in this invention can have both

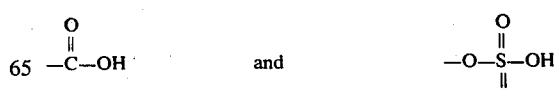

groups present.

The preferred acid group for compounds useful as chemical setting agents in this invention is the carboxylic acid group. The most preferred agents are dicarboxylic acids containing 0 to 10 carbons per carboxyl group, and their salts.

Salts of the organic polyfunctional acids are also useful. Examples of cations in salts which can be used are lithium, sodium, potassium, ammonium, calcium, magnesium, methylammonium, trimethylammonium, triethanolammonium and the like. In general, choice is a matter of preference or availability of starting materials.

The organic moiety to which a plurality of acid groups is attached can be straight or branched-chain aliphatic, alicyclic, aromatic, or heterocyclic (where the hetero atom is O, N, or S), or combination of these, such as aliphatic-substituted aromatics, alicyclics, and heterocyclics. A hetero atom such as O, N, or S can substitute for a C atom in the aliphatics and mixed aliphatics, and the aliphatics, alicyclics, and heterocyclics can contain carbon-carbon unsaturation.

Examples of polyvalent organic anions which function as setting agents for coating compositions in this invention are:

oxalate, maleate, fumarate, succinate, glutarate, citrate, tartrate, 2-hydroxy-1,2,3-propanetricarboxylate, ethylenediaminetetraacetate, 1,2,3,4-cyclopentanetetracarboxylate, thiodipropionate, trimellitate, o-phthalate, benzene hexacarboxylate,

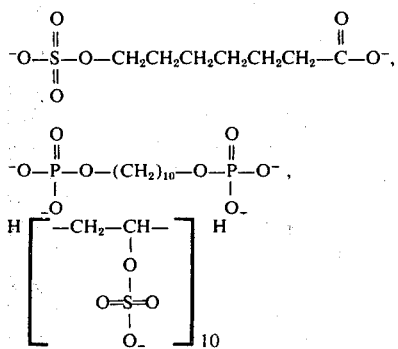

As indicated above, the organic moiety to which the plurality of acid functional groups are attached can be polymeric.

Means by which these reactive functional groups can be introduced into polymer structures are well known to the art. For instance, an unsaturated hydrocarbon containing one of the above groups can be homopolymerized or copolymerized with other suitable monomers; thus, methacrylic acid $$(CH_2=C-CO_2H)$$
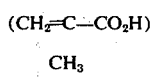

can be polymerized alone or with ethylene.

Representative of suitable comonomers for this invention are:
vinyl acetate
methyl vinyl ether
methyl methacrylate and ethyl acrylate
acrylonitrile and methacrylonitrile
styrene and α-methyl styrene
ethylene, propylene, butylene
vinyl chloride, vinylidene chloride
isoprene, chloroprene, butadiene
methyl vinyl ketone
dimethyl fumarate and maleate
acrylamide and methacrylamide It is of course possible to polymerize (or copolymerize with other monomers) salts of the unsaturated acid compounds. Examples of cations of useful salts are lithium, sodium, potassium, ammonium, calcium, methylammonium, triethanolammonium, and the like.

It is also possible to polymerize (or copolymerize with other monomers) esters or amides of the desired unsaturated acid compounds and later hydrolyze the ester or amide groups to acid groups.

Classes of polymers which are particularly effective in practicing this invention are the homopolymers and copolymers of acrylic acid and methacrylic acid. Such products are described in "Protective and Decorative Coatings," Vol. 5, pages 47–49, by J. J. Matticello, 2nd Edition, published by John Wiley and Sons, Inc., New York, N.Y.

Another means by which reactive groups can be introduced into polymer structures is through reaction of pre-formed polymers with appropriate chemical compounds. For example, a polyvinyl alcohol can be reacted with chlorosulfonic acid to give a sulfate acid polymer or with phosphoric anhydride to give a phosphate acid polymer.

Other useful polymers containing negative groups are the various modified cellulosic compounds, such as carboxymethylcellulose and its salts, hydrolyzed proteinaceous materials, gums, rosins, etc. and their salts.

Examples of inorganic polyvalent anions suitable for use in this invention include phosphate, phosphite, polyphosphate, sulfate, sulfite, borate, polyborate, silicate, chromate, molybdate, carbonate, vanadate, aluminate, arsenate, ferrocyanide, ferricyanide, thiosulfate, dithionate. Primarily, these reagent ions are employed as the salts, though the acids are not excluded providing they are stable enough to handle. Preferred anions for this use are phosphate, polyphosphate, sulfate, thiosulfate and silicate. Cations in salts can be lithium, sodium, potassium, ammonium, calcium, magnesium, methylammonium and the like. Salts can be the "acid" salts as well as the full salts; for example, sodium hydrogen phosphate and sodium dihydrogen phosphate can be used in addition to sodium phosphate. Polyphosphate compounds can be any of the commercial or specially prepared products, generally mixtures of phosphates. "Calgon" is a commercial inorganic polyphosphate mixture containing predominantly sodium hexametaphosphate.

Negative Colloid Setting Agents

Refractory grain can be treated with conventional silica sols to provide chemically-active stucco for use in this invention. Silica sols are dispersions of colloidal-size silica particles in liquid medium.

The concentration of silica in these sols can be as low as 5 percent and as high as 60 percent by weight. However, it is preferred that the silica content be at least 25 percent by weight. For the purposes of this invention, it is most preferred that the silica concentration be between 25 and 40 percent by weight.

The average diameter of the silica particles should be between about 1 and 150 millimicrons. It is preferred that the average silica particle diameter be in the range of 5–50 millimicrons and most preferred that it lie between 5 and 16 millimicrons.

The pH of the silica sol may range from 10.5 down to 7.5 or even lower with satisfactory results. It is not necessary that the negative sol be basic, since the mutual setting action of the negative and positive colloids does not depend upon pH change. The pH which is preferred is between 8.5 and 10, as in the commercial "Ludox" colloidal silica sols. Positively charged stabilizing counter ions for the colloidal silica particles in the sols are $Na^+$, as in Ludox, LS,HS,SM, and AM, $NH_4^+$, as in Ludox AS, $K^+$,$Li^+$ and quaternary ammonium. Silica sols whose particle surfaces have been modified with metal oxides to enhance negative character, such as Ludox AM with aluminate-modified silica, are useful.

Sols of other negatively charged materials, e.g., naturally occurring clays of the bentonite, attapulgite, and kaolinite types, can be used in place of silica sols.

The liquid medium for suspending the negative colloidal particles can be water, alone or mixed with low molecular weight water-miscible alcohols such as methanol and isopropanol or other polar organic liquids, or it can be one or more of these organic liquids free of water. The preferred medium is water.

Slurry Refractory Grain

In building shell molds in accordance with this invention, a finely divided refractory material may be used in the positive sol coating composition provided that it does not react with the positive sol. Among suitable refractory materials are zircon, molochite, fused silica, sillimanite, mullite and alumina. To obtain castings with a smooth surface finish, all the refractory grain in the primary or first coating composition should pass a 100-mesh sieve and preferably 85 percent should pass a 200-mesh sieve. Even finer mesh refractory may be employed for better surface finish and it is preferred in most instances. In subsequent coatings the refractory may be much coarser but it is preferred that all the material pass a 100-mesh sieve. These mesh sieve numbers correspond to the Standard U.S. Sieve Series.

Stucco Refractory Grain

The refractory material used for the stucco is preferably a coarser grade of the same refractory grain used in the slurry composition. For example, if refractory in a prime coat slurry is zircon with approximately 75 percent passing the 325-mesh sieve, the refractory used for the stucco can also be zircon in the range of −80 to 140 mesh. It is not essential, however, that refractory material of the same composition should be used for both the stucco and the slurry. Examples of refractory materials suitable for stucco are zircon, zirconia, sillimanite, mullite, fused silica, alumina and fire clay grog.

In this invention, the stucco refractory grain must be chemically active, i.e., it must contain one or more of the above-identified chemical setting agents. Chemically active stuccoing agents can be made up in two ways:

1. A solid setting agent is mixed with the refractory grain and the mixture is employed as stucco. To obviate separation of the agent and grain it is preferable that the solid agent be sieved to a particle size range approximately that of the grain. Finer or coarser agent can, of course, be used. Simple mechanical mixing is used to prepare the active stuccoing composition.
2. The grain is coated with a chemical setting agent. This may be done by applying a solution, dispersion or emulsion of the setting agent to a grain surface the evaporating the solvent. Also, a setting agent can be precipitated on a grain surface; for example, a water soluble salt of a normally insoluble polyanionic polymer can be coated on a grain and then base can be added to precipitate the polymer on the grain. Thirdly, a grain can be coated with a setting agent by applying finely divided solid agent to a moist grain surface and drying the composition.

The percentage of chemical agent which can be used in this invention can be as low as 1 percent or as high as 30 percent, or even higher (based on grain weight); preferably, the percentage of agent is 3 to 15 percent.

SLURRIES

In most instances, practice of this invention will involve the preparation and use of two slurries, both containing positive sol and refractory grain. One slurry will contain relatively fine refractory grain and will be used for the prime coat. The other will contain a coarser refractory grain and be used for the back-up or follow-up coats. However it is possible to use the same slurry for both prime coat and follow-up coats. Also, it is possible to use positive sol without refractory grain. This may be particularly advantageous, especially for the prime coat where it is desired to obtain a very fine finish on the metal casting. Generally it will be desirable to use a less expensive refractory grain in the back-up coats than is used in the prime coat.

Molochite, an aluminosilicate, is frequently used as the back-up coat for a zircon prime coat, and a slightly coarser grade of a fused silica powder is used as the back-up coat for a finer fused silica prime coat.

A discussion of the preparation of some specific slurries which are useful in the practice of this invention follows. In these slurries the positive sol is Positive Sol 130M, described hereinabove.

Zircon

The zircon slurries used in the zircon-molochite slurry system employ a finely ground zircon flour (No. 3 Grade from Casting Supply House). This flour is described as −325 mesh, since approximately 75 percent passes through this screen. This flour is mixed with positive sol to make a prime coat slurry. The resulting coatings are very smooth, dense and inert to molten metals and alloys, and possess good thermal stability to 2,500°F. and above.

In making the positive sol-zircon slurry the flour is added to the positive sol and to any water, if needed, while mixing. A propeller-type agitator is suitable for this purpose. Slurry equilibrium is usually reached after a few hours of agitation, although high shear mixing of a new batch is not recommended because of overheating. The combination of low slurry viscosity and zircon's high density can cause the grain to settle out unless sufficient agitation is maintained. The best slurry working temperature is 75°–85°F.

The zircon slurries will function over a wide range of viscosities. The viscosities obtained at 80°F. with a No.

4 Zahn Viscosimeter are in a range of 5–12 seconds and more preferably in a range of 8–10 seconds.

Molochite

The molochite employed in the zircon-molochite slurry system is a coarser flour than the No. 3 zircon flour. This flour (No. 6 Molochite, from Casting Supply House) is defined as being −200 mesh since approximately 75 percent will pass through a 200 mesh screen. No. 6 Molochite is mixed with positive sol binder to make a slurry for the back-up or follow-up coats. The positive sol-molochite slurry is made in the same manner as the zircon slurry described above. Only a few hours of mixing is required to attain slurry equilibrium. The best slurry working temperature is in the range of 75°–85°F. At 80°F, the viscosity of the positive sol-molochite slurry obtained with a No. 4 Zahn cup is in the range of 5–11 seconds and more preferably 7–8 seconds.

Fused Silica

Two different particle sizes of "Nalcast" fused silica (Nalco Chemical Company) are used for dip slurries. These are Nalcast P1W fused silica flour and Nalcast P-2 fused silica flour.

Nalcast P1W flour has a wide particle size distribution and is used with positive sol to prepare a thick slurry for the inner or prime shell coat. Nalcast P1W is defined as −200 mesh since all the grains will pass through a 200 mesh sieve and approximately 75 percent will pass a 325 mesh sieve.

In making the positive sol- Nalcast P1W slurry the sol is added along with the calculated amount of water to the mixing container. Technical grade (70%) hydroxyacetic acid is added to the positive sol at approximately 2 percent by weight based on solids, in order to maintain the slurry viscosity. The apparent chemical function of the acid is to complex with ionic impurities, especially those arising from iron in the silica, which have a destabilizing effect upon positive sol. The Nalcast P1W flour is then added with good agitation to the sol. About 85 percent of the flour will stir in readily; the last portion is added in small increments. The use of efficient mixing equipment will permit the preparation of a suitable slurry in a few hours. The stirrer should be stopped for periods to allow the entrapped air bubbles to rise to the surface and break. Care should be taken that stirring is not carried out with excessive shear such that the slurry overheats from the friction generated. The best slurry working temperature is 75°–85°F. The slurry will function over a wide range of viscosity, but a suitable viscosity measured with a No. 4 Zahn cup at 80°F. is in the range 25–35 seconds and more preferably 29–31 seconds.

Nalcast P-2 flour is a coarser powder than Nalcast P1W and is defined as −100 mesh since all will pass through a 100 mesh screen and approximately 45 percent will pass a 325 mesh screen. Nalcast P-2 flour is used with the positive sol binder to make a slurry for forming the back-up or outer shell coats.

The positive sol- Nalcast P-2 slurry is made in the same manner as the corresponding Nalcast P1W slurry. However, the Nalcast P-2 slurry is easier to mix because Nalcast P-2 flour is coarser than Nalcast P1W and the slurry is made less viscous. The slurry viscosity as determined on the No. 4 Zahn cup at 80°F. is suitably in the range 12–25 seconds; more preferably in the range 15–18 seconds.

The broad ranges of composition along with the more preferred ranges of compositions for prime and back-up coats in both the zircon-molochite and Nalcast fused silica systems just discussed are given in Tables I annd II.

TABLE I

ZIRCON-MOLOCHITE SYSTEM

| Prime Coat Slurry | Composition, Parts by Weight | |
|---|---|---|
| | Broad Range | Preferred Range |
| Zircon Refractory Flour, 325 mesh | 86–50 | 86–67 |
| Aqueous Positive Sol | 14–50 | 14–33 |
| Extra Water | As needed | None |
| pH | 4.3–4.8 | 4.3–4.8 |
| Viscosity, No. 4 Zahn Cup, Sec. | 5–12 | 6–11 |
| Colloidal Particle to Refractory Flour Ratio | 0.05–0.30 | 0.05–0.15 |

| Back-Up Slurry | Composition, Parts by Weight | |
|---|---|---|
| | Broad Range | Preferred Range |
| Molochite Refractory Flour, 200 Mesh | 75–50 | 65–50 |
| Aqueous Positive Sol | 25–50 | 35–50 |
| Extra Water | As Needed | None |
| pH | 4.5–5.0 | 4.5–5.0 |
| Viscosity, No. 4 Zahn Cup, Sec. | 5–11 | 7–9 |
| Colloidal Particle to Refractory Flour Ratio | 0.10–0.335 | 0.16–0.30 |

TABLE II

"NALCAST" FUSED SILICA SYSTEM

| Prime Coat Slurry | Composition, Parts by Weight | |
|---|---|---|
| | Broad Range | Preferred Range |
| "Nalcast" P1W Fused | 75–60 | 70.5–69 |
| Aqueous Positive Sol | 10–40 | 16.5–31 |
| Extra Water | 14–0 | 13–0.0 |
| Hydroxyacetic Acid (70%) | 1.0–3.0 | 0.5 |
| pH | 3.8–4.2 | 3.8–4.2 |
| Viscosity, No. 4 Zahn Cup, Sec. | 25–35 | 28–32 |
| Colloidal Particle to Refractory Flour Ratio | 0.04–0.20 | 0.05–0.10 |
| Back-Up Slurry | | |
| "Nalcast" P-2 Fused Silica | 75–53.5 | 75–60 |
| Aqueous Positive Sol | 10–46.5 | 25–40 |
| Extra Water | 14–0 | None |
| Hydroxyacetic Acid (70%) | 1.0–3.0 | 0.5–0.4 |
| pH | 3.8–4.2 | 3.8–4.2 |
| Viscosity, No. 4 Zahn Cup, Sec. | 12–25 | 15–19 |
| Colloidal Particle to Refractory Flour | 0.04–0.26 | 0.10–0.20 |

Adjustment of the slurries to a suitable working viscosity range is carried out by adding water or refractory flour as needed. In the more preferred ranges of colloidal particle to refractory flour ratios water or refractory flour additions are rarely needed in preparing the slurries, but for the lower ratios some additional water is generally required. Over the working life of the slurries frequent water additions are made to maintain proper consistency in order to compensate for water loss by evaporation.

The working viscosities are low initially and this enhances ready penetration of the slurries into recessed areas or blind cores of patterns, providing proper filling with slurry and preventing air entrapment, sometimes obtained with high viscosity slurries.

The pH of the slurries as indicated in the Tables is measured with a Beckman Zeromatic pH meter using a Beckman 39301 glass electrode and a Beckman 39402 Calomel reference electrode. The reported pH values are those of the slurries as mixed. These values are not critical and no significant pH change is observed in the working life of the slurries up to several weeks.

In the Nalcast fused silica slurries, both the prime coat and back-up coat viscosities are higher than those employed in the zircon-molochite system. However, these fused silica slurry viscosities are less than those normally used in the Nalcast -aqueous colloidal silica system. The lower viscosities aid in wetting out and uniformly building up recessed areas and blind cores on wax patterns.

Pattern Materials and Cleaning

Conventional wax and plastic expendable patterns of the object to be reproduced in metal are prepared. These patterns are then affixed to a sprue and runner system, giving the usual cluster arrangement needed to produce them in multiple. The pattern assembly or cluster is cleaned with a suitable solvent such as methyl ethyl ketone, trichloroethylene or alcohol mixtures to remove soil and release agents used in their preparation. The solvent-cleaned assembly is dried and as such is ready for dipping in the prime coat slurry.

Although wax and plastics are the preferred expendable pattern materials others such as low-melting tin-bismuth alloys may also be employed.

Dipping

In the shell building process a solvent-cleaned, expendable pattern assembly such as wax is first dipped into a bath comprising a positive sol which preferably contains refractory grain. The pattern assembly is thoroughly wetted in the prime coat slurry, withdrawn, drained and rotated to insure complete coverage in recessed areas or in blind cores. The coated pattern is then stuccoed with a chemically active stuccoing material as described above. Stuccoing is accomplished in the conventional manner by dipping the coated pattern into a fluidized bed of the active stucco grain or by sprinkling the active stucco grain onto the surface of the coated pattern.

After stuccoing, it is generally necessary to allow 1 to 5 minutes for the chemical setting agent to immobilize the prime coat before the pattern can be dipped into the first back-up coat slurry. The time depends upon the solubility of the setting agent in the coating mixture and its level of activity.

After the prime coat is applied, stuccoed, and set, the coated pattern is dipped into the back-up coat slurry, again stuccoed with chemically active refractory grain, and the back-up coat is allowed to set. Setting of the back-up coat also will generally require about 1 to 5 minutes. These steps are repeated until a coating of the desired thickness is obtained. Usually about eight to 10 coats, including prime coat and back-up coats, are used. However, as little as a total of four coats or even less can be employed, or as much as 30 coats or more, depending upon wax pattern assembly, pattern size, and configuration. The large number of coats can find application in making shells for massive castings not usually made by the precision investment casting technique.

Drying

After the final coat is applied the shell assembly is ready for drying. Drying under ambient conditions for 18 to 24 hours is sufficient to drive off the bulk of the water enabling the assembly to be dewaxed without blistering or exhibiting cracks. Forced air drying at 110°F. for 5 hours is also sufficient to evaporate a comparable quantity of water and permit dewaxing of the shell without blistering or exhibiting cracks.

Dewaxing

Dewaxing of the shells may be carried out by the normal procedures available; i.e., flash furnace dewaxing at 1,700°–1,900°F., steam autoclave dewaxing and solvent vapor dissolving of the wax.

Flash dewaxing is carried out by placing the shell assembly in a furnace previously heated at 1,700°–1,900°F. At these temperatures the wax is heated and expands, exerting an internal pressure on the shell structure. This pressure is relieved by the wax melting and running out the pouring cup in the shell assembly and also to a lesser extent permeating into the pores of the structures. Shell assemblies dried under controlled humidity and temperature conditions as well as forced air dried at 100°F. for 5 hours as cited previously, do not exhibit cracks or blisters and are suitable for metal casting.

Steam autoclave dewaxing, like furnace flash dewaxing, also depends on rapid heating of the wax and melting of it to relieve the internal pressure on the shell assembly. As a consequence, after loading the shell assemblies in an autoclave, steam pressure is raised as quickly as possible to promote rapid heating of the wax. Shell assemblies dewaxed in a stream autoclave exhibit crack free and blister free surfaces suitable for metal casting.

Solvent vapor elimination of the wax in shell assemblies is carried out with the trichloroethylene vapor. The solvent is boiled in a lower portion of a degreasing tank and the vapors penetrate the pores of the ceramic shell assembly and immediately dissolve the wax faces adjacent to the ceramic investment before the heat of the solvent vapors expands the wax. Subsequently the bulk of the wax pattern is melted, but only after the internal pressure on the shell structure is relieved. Shell assemblies in which the wax is removed by the solvent vapor technique exhibit crack free and blister free shells suitable for metal casting.

EXAMPLES

The following examples further illustrate the process and products of this invention. In the examples percentages and parts are by weight unless otherwise specified.

EXAMPLE I

A shell mold suitable for precision casting of metals is prepared according to the method of this invention in the following manner.

A prime coat slurry is prepared by mixing 352 mesh zircon grain (No. 3 flour, Casting Supply House) with Positive Sol 130M, an aqueous dispersion of aluminum-coated colloidal silica, and stirring the mixture for 24 hours before use. The composition having a binder solids-to-zircon ratio of 0.09, is:

| Prime Coat Slurry A | Parts by Weight |
| --- | --- |
| Zircon flour, 325 mesh | 77.0 |
| Positive Sol 130M (30% SiO$_2$-Al$_2$O$_3$) | 23.0 |

In the same manner a back-up coat slurry is prepared by mixing 200 mesh molochite grain (No. 6 flour, Casting Supply House) with Positive Sol 130M and stirring for 24 hours before use. The composition having a binder solids-to-molochite ratio 0.16, is:

| Back-Up Coat Slurry B | Parts by Weight |
| --- | --- |
| Molochite flour, 200 mesh | 64.5 |
| Positive Sol 130M (30% SiO$_2$-Al$_2$O$_3$) | 35.5 |

A wax pattern is thoroughly cleaned in methyl ethyl ketone. The pattern is then dipped into prime coat Slurry A until wetted, withdrawn and drained of excess slurry and, while still wet, inserted into a fluidized bed containing a mixture of 90 percent zircon stucco grain (No. 1 zircon, −80 to +140 mesh, Casting Supply House), 10 percent sodium lauryl sulfate (100 to 140 mesh).

Similarly, the pattern is given a back-up coat of Slurry B and stuccoed with a mixture of 90 percent molochite grain (−30 to +60 mesh, Casting Supply House) and 10 percent sodium lauryl sulfate (48 to 100 mesh) in a fluidized bed.

This sequence is repeated 6 times with back-up coat Slurry B to give a mold approximately 3/8 inch thick within about 20 minutes. At no point is sloughing of a coating seen. The stabilities of the two slurries used in this procedure are found to be unimpaired.

After air drying under ambient conditions for 24 hours the wax is removed from the mold by heating the coated pattern in a melt-out furnace at 1,700° to 1,800°F. for 2 to 3 minutes. The shell is heated an additional 15 to 20 minutes to insure complete removal of carbon.

The mold is free of cracks and other defects and is suitable for metal casting.

Subsequently, AMS 5382 high temperature alloy (25% Cr, 10% Ni, 8% W, and the remainder Co, nominal analysis) is poured into the mold to give a sound casting.

EXAMPLES II–V

Example I is repeated substituting the listed setting agents in the amounts shown for the sodium lauryl sulfate of Example I.

| Example | Setting Agents | % Grain Weight |
| --- | --- | --- |
| II | Ammonium Dodecylbenzene Sulfonate | 5 |
| III | Potassium Tetradecanoate | 10 |
| IV | Dioctyl Sodium Sulfosuccinate | 15 |
| V | p-Octylbenzoic Acid | 7.5 |

EXAMPLE VI

A shell mold is prepared according to the method of this invention in a manner similar to that employed in Example I.

A zircon prime coat slurry made with Positive Sol 130M, designated A in Example I, is used in constructing the mold.

In the manner of Example I a back-up coat slurry is prepared. The proportion of ingredients is formulated to give a binder solids-to-refractory grain ratio of 0.30. This is designated back-up coat Slurry C:

| Back-Up Coat Slurry C | Parts by Weight |
| --- | --- |
| Molochite flour, 200 mesh | 50.0 |
| Positive Sol 130M (30% SiO$_2$-Al$_2$O$_3$) | 50.0 |

A shell mold is built up on a wax pattern as described in Example I using zircon and molochite stucco grains coated with 8 percent of their weights of sodium succinate to set prime and back-up coatings. Complete fabrication of these shells requires only 15 min. The air dried and fired mold is free of cracks and other defects and suitable for casting of metals.

EXAMPLE VII–IX

Example VI is repeated substituting the listed setting agents in the amounts shown for the sodium succinate of Example VI.

| Example | Setting Agent | % Grain Weight |
| --- | --- | --- |
| VII | Ammonium Oxalate | 12.5 |
| VIII | Potassium Acid Phthalate | 10 |
| IX | Sodium Dihydrogen Phosphate | 3.5 |
| X | Ammonium Sulfate | 7.5 |
| XI | "F" Grade Sodium Silicate (Du Pont Co.) | 15 (SiO$_2$) |

EXAMPLE XII

A shell mold is prepared according to the method of this invention in a manner similar to that described in Example I.

One slurry is used in this example. It is designated Slurry D and is prepared by mixing Nalcast P1W fused silica flour (Nalco Chemical Co.) with Positive Sol 130M containing hydroxyacetic acid and stirring for 48 hours before use. The hydroxyacetic acid is required for stabilization purposes and is added with additional water to the Positive Sol 130M prior to the silica flour. Binder solids-to-refractory grain weight ratio is 0.10.

| Slurry D | Parts by Weight |
| --- | --- |
| "Nalcast" P1W fused silica, 200 mesh | 70.1 |
| Positive Sol 130 M (30% SiO$_2$-Al$_2$O$_3$) | 23.4 |
| Water | 6.0 |
| (70% Tech.) | 0.5 |

A shell mold is formed on a clean wax pattern in the manner described in Example I except in this case one slurry serves for both prime and back-up coats:

Initially a prime coat of Slurry D is applied and stuccoed with Nalcast S-1 fused silica grain (Nalco Chemical Co.) coated with 5 percent of its weight of "Acrysol" AGE-60 polymer (Rohm & Haas Co.), a methyl acrylate/acrylic acid copolymer.

Six back-up coats of Slurry D stuccoed with Nalcast S-2 fused silica (Nalco Chemical Co.) then is applied and set in the same way.

Complete fabrication of the shell mold requires 25 minutes. The air dried and fired mold is free of cracks and other defects and is satisfactory for casting of metals.

EXAMPLES XII–XV

Example XII is repeated substituting the listed setting agent polymers in the amounts shown for the Acrysol AGE-60 of Example XII.

| Example | Setting Agent | % Grain Weight |
|---|---|---|
| XIII | Acrysol A-1 Polyacrylic acid (Rohm & Haas Co.) | 15 |
| XIV | 75/25 vinyl acetate/potassium 4-vinyl benzene sulfonate copolymer | 10 |
| XV | "Gantrez" AN-119 methyl vinyl ether/maleic anhydride copolymer (General Aniline & Film Co.) | 7.5 |

EXAMPLE XVI

A shell mold of excellent quality is prepared according to the procedure set forth in Example I, using the compositions given therein, with the exception that:

Positive Sol 130M is replaced in the prime coat and back-up coat slurries with another acidic aqueous dispersion of positively charged colloidal particles which have acetate rather than chloride counter-ions and is referred to as an acetate positive sol. The percent silica-alumina solids in this sol is also 30 percent.

EXAMPLES XVII–XX

Shell molds are prepared according to the procedure set forth in Example I, using the compositions given therein, with the exception that the listed setting agents in the amounts shown are substituted for sodium lauryl sulfate as solid additives to stucco grains.

| Example | Setting Agent | % Grain Weight |
|---|---|---|
| XVII | Benzamidine | 12 |
| XVIII | Guanidine Carbonate | 5 |
| XIX | Magnesium Hydroxide | 3.5 |
| XX | Lithium Hydroxide | 10 |

Although the invention has been described with particular reference to its preferred use in making expendable refractory shell molds for precision investment casting of metals it obviously can be adapted to many other useful purposes. In general it can be used in any case where it is desired to provide a high temperature resistant, heat insulating layer on the surfaces of an object such as an automobile muffler or manifold. For this purpose any desired refractory insulating material can be used. For example, expanded perlite, coated or mixed with a chemical setting agent as defined above, can be alternated with positive sol to build up a heat-insulating coating. Alternatively, or additionally, the refractory insulating material can be included in the positive sol slurries. A further application of the process is to provide high temperature-resistant coatings which are heat conductive by including a particulate refractory metal in the slurries. Since the slurries can be low viscosity the process can be adapted to the manufacture of a variety of intricate refractory shapes on disposable or permanent cores.

It is frequently desirable to include in the positive sol dip bath a fibrous reinforcing agent to improve the green and fired strengths of the resulting refractory laminates. Examples of fibers which can be used are Kaowool volcanic rock fibers, Fiberfrax aluminosilicate fibers, and glass fibers.

I claim:

1. A process for forming a refractory laminate on the surface of a support structure which comprises:
   a. dipping the structure into a bath comprising a sol of positively charged colloidal particles of an inorganic substance to form a coating on the surface,
   b. applying to the surface a particulate refractory material containing a chemical setting agent for the sol of positively charged colloidal particles, said setting agent being selected from the group consisting of (1) organic and inorganic bases, (2) monofunctional organic acids and their salts having an anionic portion containing at least one alkyl group of from 6 to about 24 carbon atoms per acid functional group, (3) polyfunctional organic and inorganic acids and their salts, and (4) negatively charged colloidal particles of an inorganic substance, and
   c. repeating steps (a) and (b) in the same order until a refractory laminate of the desired thickness is built up on the surface.

2. Process of claim 1 wherein the positively charged colloidal particles in the bath of step (a) comprise a silica core coated with a polyvalent metal/oxygen compound.

3. Process of claim 2 wherein the polyvalent metal/oxygen compound is alumina.

4. Process of claim 3 wherein the bath of step (a) comprises a slurry of particulate refractory material in the sol of positively charged colloidal particles.

5. A rapid process for forming expendable refractory shell molds for precision investment casting of metals comprising:
   a. dipping a disposable pattern of the metal casting in a bath comprising a sol of positively charged colloidal particles of an inorganic substance to form a coating on the pattern,
   b. stuccoing the coated pattern with a refractory grain containing a chemical setting agent for the sol of positively charged colloidal particles, said setting agent being selected from the group consisting of (1) organic and inorganic bases, (2) monofunctional organic acids and their salts having an anionic portion containing at least one alkyl group of from 6 to about 24 carbon atoms per acid functional group, (3) polyfunctional organic and inorganic acids and their salts containing up to about 24 carbon atoms per acid functional group and (4) negatively charged colloidal particles of an inorganic substance, and
   c. repeating steps (a) and (b) in the same order until a refractory shell mold of the desired thickness is built up on the pattern.

6. Process of claim 5 wherein the positively charged colloidal particles in the bath of step (a) comprise a silica core coated with a polyvalent metal/oxygen compound.

7. Process of claim 6 wherein the polyvalent metal/oxygen compound is alumina.

8. Process of claim 7 wherein the bath of step (a) is a slurry of refractory grain in the sol of alumina-coated colloidal silica particles.

9. Process of claim 8 wherein two slurries of refractory grain in a sol of alumina-coated colloidal silica particles are used, the first slurry containing fine refractory grain and being used for the prime coat, and the second slurry containing coarse refractory grain and being used for subsequent coats.

10. Process of claim 8 wherein the chemical setting agent is present as a coating on the stucco refractory grain.

* * * * *